(12) United States Patent
Garcia et al.

(10) Patent No.: US 9,644,722 B2
(45) Date of Patent: May 9, 2017

(54) ONE MODE CONTINUOUSLY VARIABLE TRANSMISSION

(71) Applicant: GM Global Technology Operations LLC, Detroit, MI (US)

(72) Inventors: Pete R. Garcia, Madison Heights, MI (US); James M. Hart, Belleville, MI (US); Edward W. Mellet, Rochester Hills, MI (US); Elizabeth I. Wooden, Farmington Hills, MI (US); Douglas John Dwenger, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/615,713

(22) Filed: Feb. 6, 2015

(65) Prior Publication Data
US 2015/0233458 A1 Aug. 20, 2015

Related U.S. Application Data

(60) Provisional application No. 61/942,426, filed on Feb. 20, 2014.

(51) Int. Cl.
*F16H 37/02* (2006.01)
*F16H 47/06* (2006.01)

(52) U.S. Cl.
CPC ......... *F16H 37/022* (2013.01); *F16H 47/065* (2013.01); *F16H 2037/026* (2013.01); *F16H 2200/0008* (2013.01)

(58) Field of Classification Search
CPC ................. F16H 37/022; F16H 47/065; F16H 2037/026; F16H 2037/028
USPC .......................................... 475/210, 213, 326
See application file for complete search history.

(56) References Cited

U.S. PATENT DOCUMENTS

| | | | | |
|---|---|---|---|---|
| 4,676,356 A * | 6/1987 | Beccaris | ................. | F16D 13/56 192/111.16 |
| 5,607,371 A * | 3/1997 | Yamaguchi | ........... | F16H 37/022 474/28 |
| 5,895,335 A * | 4/1999 | Haka | ..................... | F16H 37/022 475/210 |
| 6,202,814 B1 * | 3/2001 | Braford, Jr. | ......... | F16D 25/0638 188/264 E |

(Continued)

FOREIGN PATENT DOCUMENTS

| | | |
|---|---|---|
| CN | 1890492 A | 12/2004 |
| CN | 102906459 A | 1/2013 |
| JP | 2002327828 A2 | 11/2002 |
| KR | 102007008616 A | 7/2007 |

OTHER PUBLICATIONS

"What is a thrust washer"; http://www.ehow.com/about_5077325_thrust-washer.html; Dec. 27, 2016.*
U.S. Appl. No. 14/262,068, filed Apr. 25, 2014 by Edward W. Mellet et al. All Pages.
Herbert Mozer, The Technology of the ZF CVT—CFT 23 SAE Technical Paper Series, SAE 2001 World Congress, Detroit, MI; Mar. 5-8, 2001.
Chiptuner, Continuously Variable Transaxle (CVT).

*Primary Examiner* — Roger Pang

(57) ABSTRACT

A powertrain for a motor vehicle includes a one mode continuously variable transmission (CVT) and a torque converter connected to a planetary gear set assembly which is connected to a pulley and a chain assembly or other continuously variable unit (CVU). The planetary gear set arrangement generally includes one planetary gear set, one brake and one clutch. The CVU is connected to a final drive unit. The sheaves of the CVU have an involute spline connection.

18 Claims, 11 Drawing Sheets

(56) References Cited

U.S. PATENT DOCUMENTS

| | | | |
|---|---|---|---|
| 6,544,140 B2 * | 4/2003 | Gradu | F16C 19/547 384/585 |
| 8,579,753 B2 | 11/2013 | Heitzenrater et al. | |
| 8,888,645 B2 | 11/2014 | Xu | |
| 8,961,350 B1 * | 2/2015 | Mellet | F16H 37/022 475/210 |
| 2002/0020601 A1 * | 2/2002 | Martin | F16D 25/0638 192/85.4 |
| 2003/0040398 A1 * | 2/2003 | Nerstad | F16H 3/54 475/269 |
| 2005/0245346 A1 * | 11/2005 | Blair | F16H 3/66 475/282 |
| 2005/0250606 A1 * | 11/2005 | Shioiri | F16H 9/125 474/18 |
| 2007/0117664 A1 * | 5/2007 | Shioiri | F16H 55/56 474/28 |
| 2009/0062044 A1 * | 3/2009 | Shioiri | F16H 55/56 474/13 |
| 2012/0132498 A1 * | 5/2012 | Hauck | F16D 21/06 192/48.601 |
| 2014/0011616 A1 * | 1/2014 | Ijichi | F16H 55/56 474/28 |

* cited by examiner

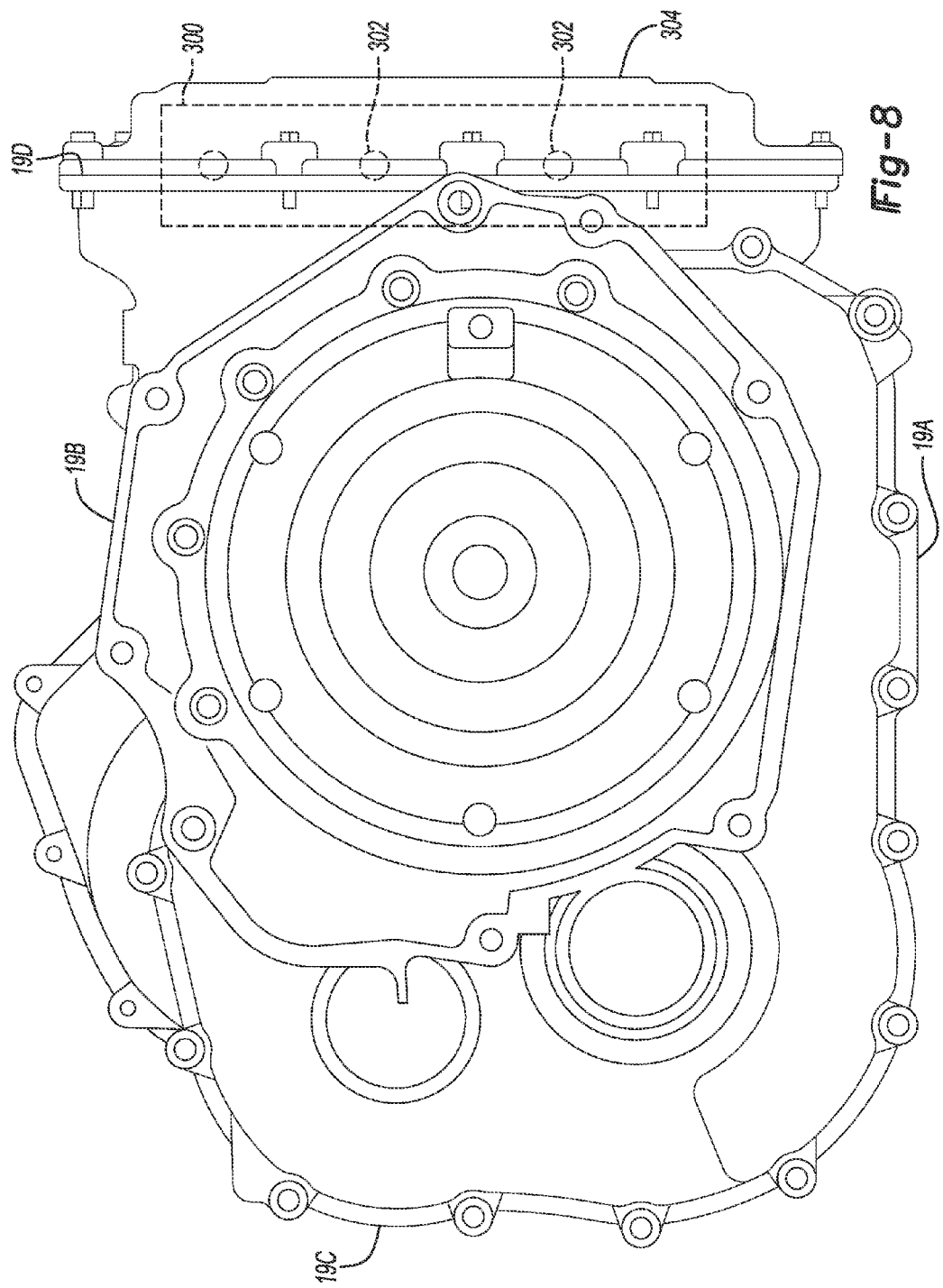

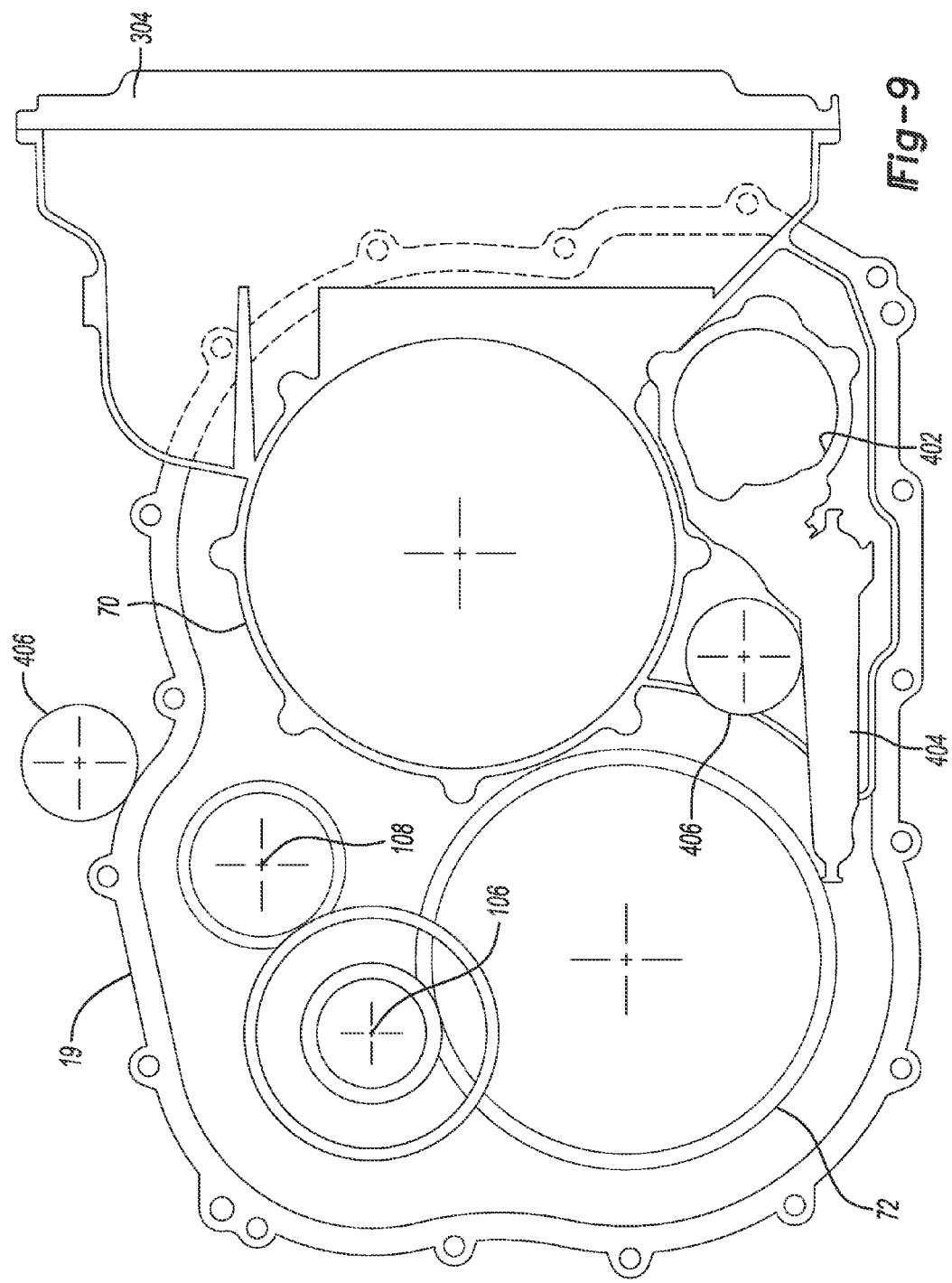

ONE MODE CONTINUOUSLY VARIABLE TRANSMISSION

CROSS-REFERENCE TO RELATED APPLICATIONS

This application claims the benefit of U.S. Provisional Application No. 61/942,426 filed Feb. 20, 2014. The disclosure of the above application is incorporated herein by reference.

FIELD

The present disclosure relates to automatic transmissions and more particularly to a one mode continuously variable transmission for a front wheel drive motor vehicle.

BACKGROUND

The statements in this section merely provide background information related to the present disclosure and may or may not constitute prior art.

A continuously variable transmission ("CVT") typically includes a chain and pulley system that operatively couples a rotary power source, such as an engine or electric motor, to a double gear final drive unit. The chain and pulley system generally includes first and second pairs of pulley cones having a torque transmitting chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

While previous designs have been suitable for their intended purpose, there is a constant need for improved CVT designs that minimize axial length and mass while providing sufficient performance characteristics.

SUMMARY

A powertrain for a motor vehicle having a one mode continuously variable transmission (CVT) is provided. The powertrain includes an engine, a torque converter connected to the engine, and a one mode CVT. The one mode CVT includes a transmission housing, an input member connected to the torque converter, an output member, a planetary gear set having a ring gear member connected to the input member, a carrier member, and a sun gear member, a clutch selectively engageable to connect the input member and the ring gear member to the sun gear member, a brake selectively engageable to connect the carrier member to the transmission housing, a first pulley connected to the sun gear member, a second pulley connected to the output member, and an endless member wrapped around the first pulley and the second pulley. Engagement of the clutch initiates a forward speed range and engagement of the brake initiates a reverse speed range.

In one aspect of the present invention, the endless member is a chain and the first pulley includes a moveable sheave slidably disposed on a fixed sheave, and wherein the moveable sheave is connected to the fixed sheave by an involute spline connection.

In another aspect of the present invention, the fixed sheave includes an axially extending portion and a first involute spline is formed on an outer diameter of the axially extending portion, and wherein the moveable sheave includes a second involute spline formed on an inner diameter of the moveable sheave, and the first involute spline is intermeshed with the second involute spline.

In another aspect of the present invention, the brake is actuated by a piston assembly having a piston slidably disposed within a piston housing, and wherein the piston housing is a separate unit from the transmission housing.

In another aspect of the present invention, the piston assembly is coupled to an inside surface of the transmission housing.

In another aspect of the present invention, the brake includes a plurality of separator springs disposed between each of adjacent clutch plates and reaction plates, and wherein the separator springs bias the brake to a disengaged state.

In another aspect of the present invention, a transfer shaft is connected to a pinion and gear assembly, and the transfer shaft is connected to the output member of the transmission by a co-planar gear set and the transfer shaft and the pinion and gear assembly are supported within the transmission housing.

In another aspect of the present invention, the transfer shaft is supported at one end by a first set of ball bearings and supported at another, opposite end by a second set of ball bearings, and an end ring provides axial support to the second set of ball bearings, and a housing of the pinion/gear assembly is supported by a third set of ball bearings and a fourth set of ball bearings.

In another aspect of the present invention, the transfer shaft is supported at one end by a first set of roller bearings and supported at another, opposite end by a second set of ball bearings, and a first snap ring and a second snap ring are disposed on either side of the first set of roller bearings.

In another aspect of the present invention, the transfer shaft is supported at one end by a first set of roller bearings and a first set of thrust bearings and supported at another, opposite end by a second set of roller bearings and a second set of thrust bearings, and a first brace plate is disposed axially between the first set of roller bearings and the first set of thrust bearings and a second brace plate is disposed axially between the second set of roller bearings and the second set of thrust bearings.

In another aspect of the present invention, the powertrain includes a main pump driven by the engine and an auxiliary pump, and the auxiliary pump is deposed adjacent to the main pump near a bottom of the transmission housing.

In another aspect of the present invention, the powertrain includes a main pump driven by the engine and an auxiliary pump, and the auxiliary pump is disposed at a top of the transmission housing and is disposed external to the transmission housing.

In another aspect of the present invention, the torque converter includes a three-stage damper assembly connected between the engine and the input member of the transmission.

In another aspect of the present invention, the torque converter includes a tuned absorber connected between the engine and the input member of the transmission.

In another aspect of the present invention, the torque converter includes a pendulum damper connected between the engine and the input member of the transmission.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and is not intended to limit the scope of the present disclosure in any way.

FIG. 8 is a side view of the transmission; and

FIG. 9 is a partial side cross-section of the transmission.

DETAILED DESCRIPTION

The following description is merely exemplary in nature and is not intended to limit the present disclosure, application, or uses.

Figure 1:
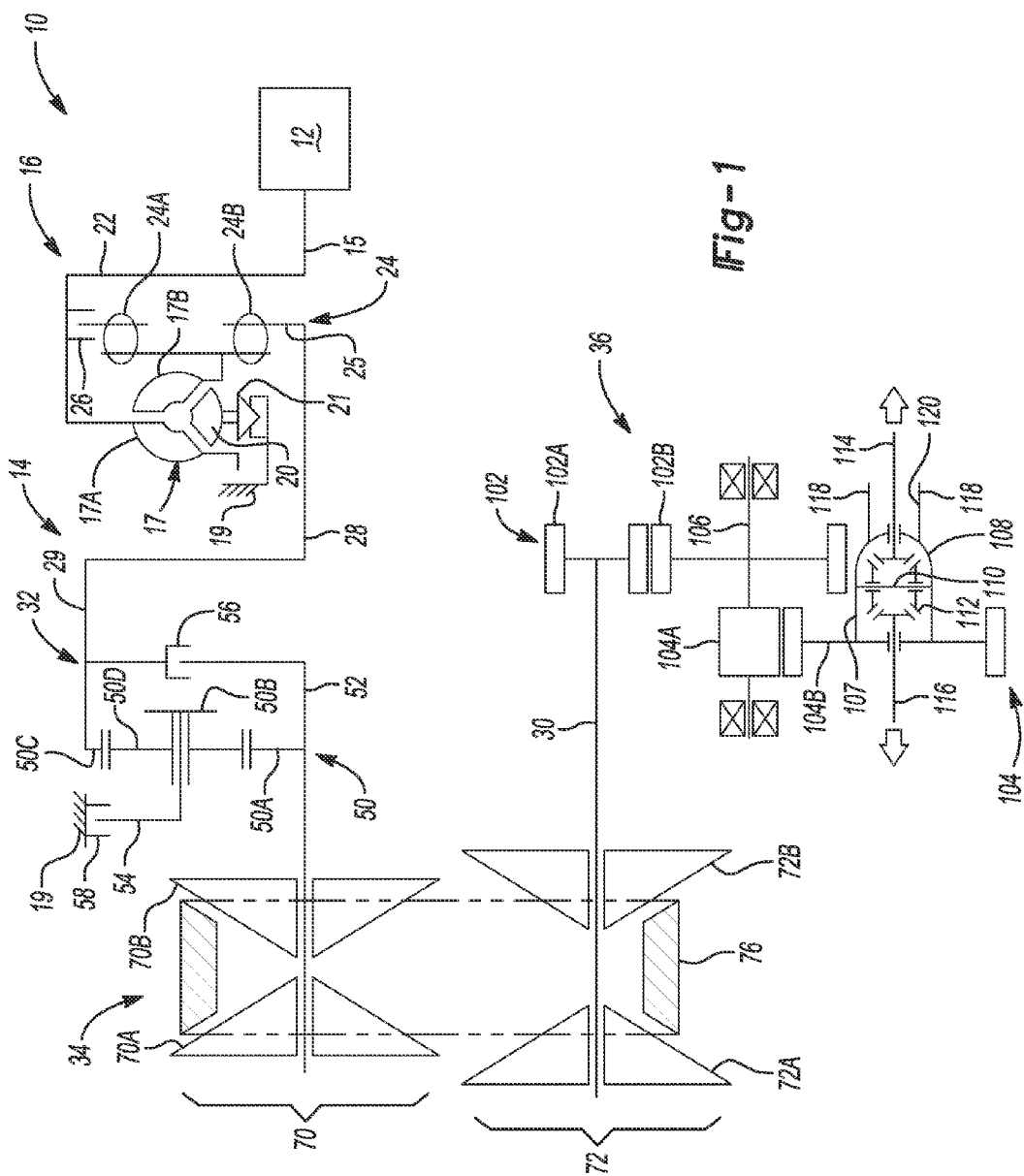
FIG. 1 is a schematic diagram of a powertrain according to the principles of the present invention.
Figure 2:
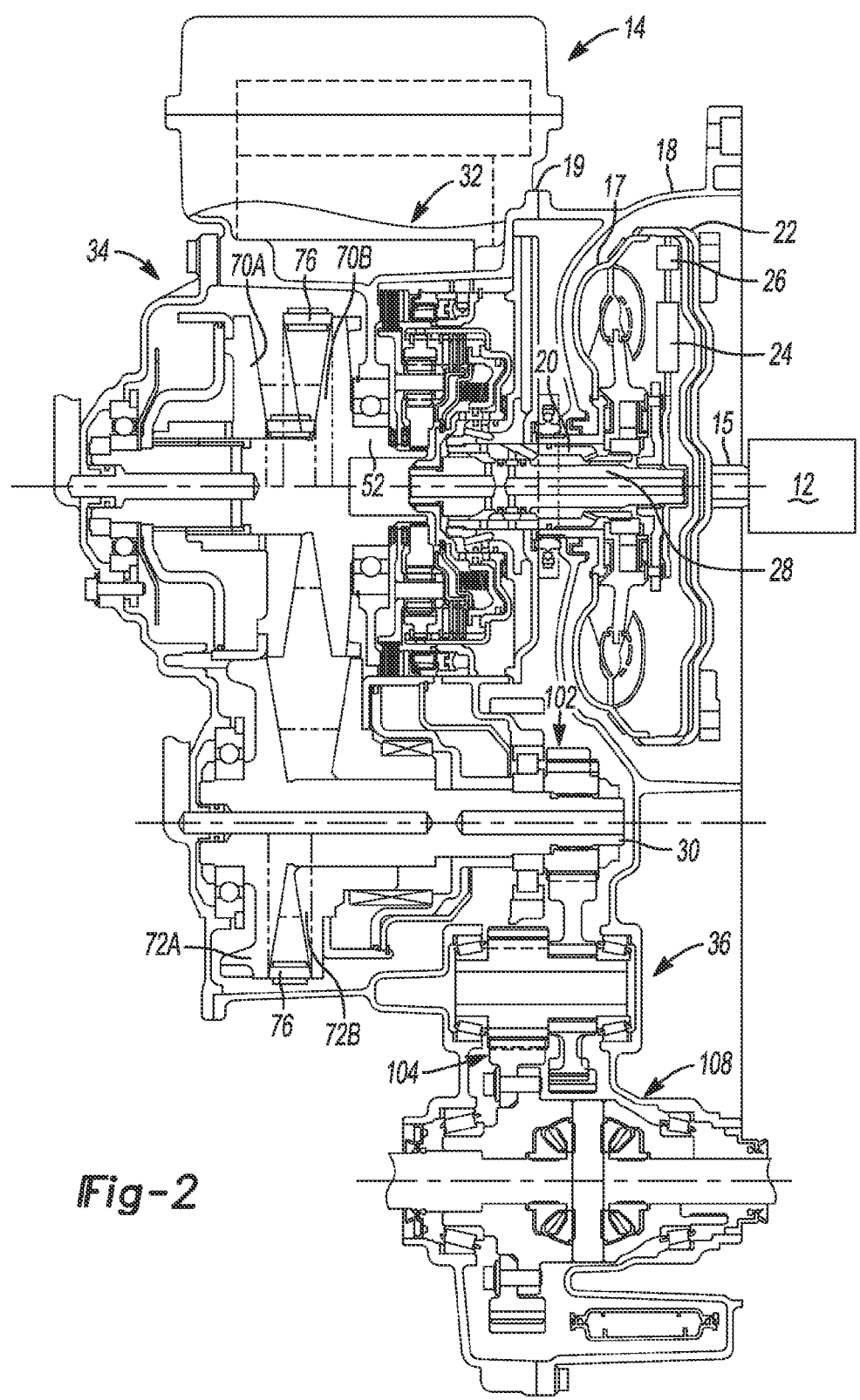
FIG. 2 is a cross-section of the powertrain according to the principles of the present invention.

With reference to FIGS. 1 and 2, a powertrain for a motor vehicle is generally indicated by reference number 10. The powertrain 10 generally includes an engine 12 interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 includes an engine output shaft 15 that supplies a driving torque to the transmission 14 through a torque converter 16.

The torque converter 16 includes a torus 17 contained within a torque converter housing 18. The torque converter housing 18 is coupled to a transmission housing 19. The torus 17 includes a pump 17A, a stator 20 which connects to the transmission housing 19 through a one-way clutch 21 to insure that the torus 17 rotates in only one direction, and a turbine or output 17B. The pump 17A is connected to the engine output shaft 15 by a shaft or member 22. The torque converter 16 further includes a spring/damper assembly 24 connected to the turbine 17B. In the example shown in FIG. 1, the spring/damper assembly 24 is a 2-stage damper assembly having two spring/dampers 24A and 24B. The spring/damper assembly 24 is selectively coupled to the pump 17A or the interconnecting member 22 by a torque converter clutch 26. The TCC 26 bypasses the torus 17 and torque is transferred directly through the spring/damper assembly 24 to minimize vibrations from the engine 12 to the transmission 14. The spring/damper assembly 24 outputs torque to a turbine shaft 25. The turbine shaft 25 is connected to an input of the transmission 14, as will be described below.

Figure 3C:
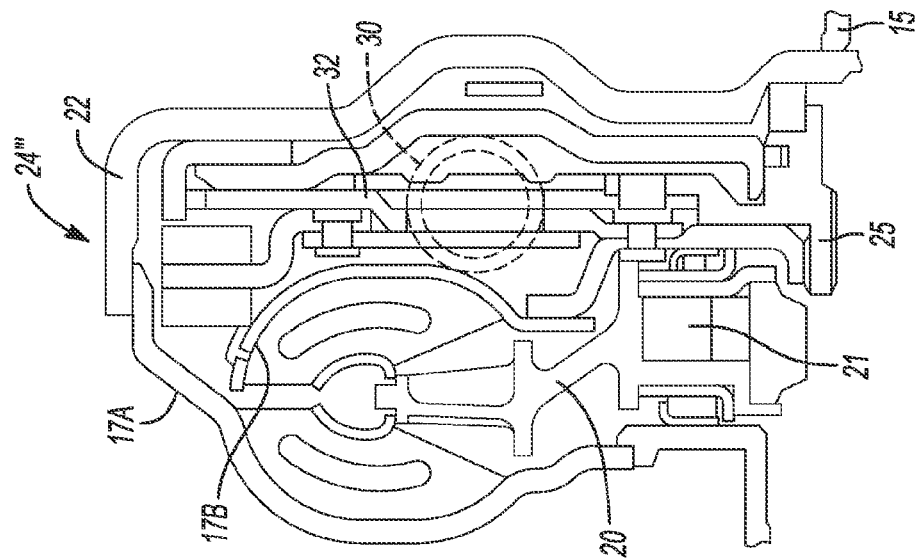
FIG. 3C is a cross-section of a torque converter having a pendulum damper assembly.
Figure 3B:
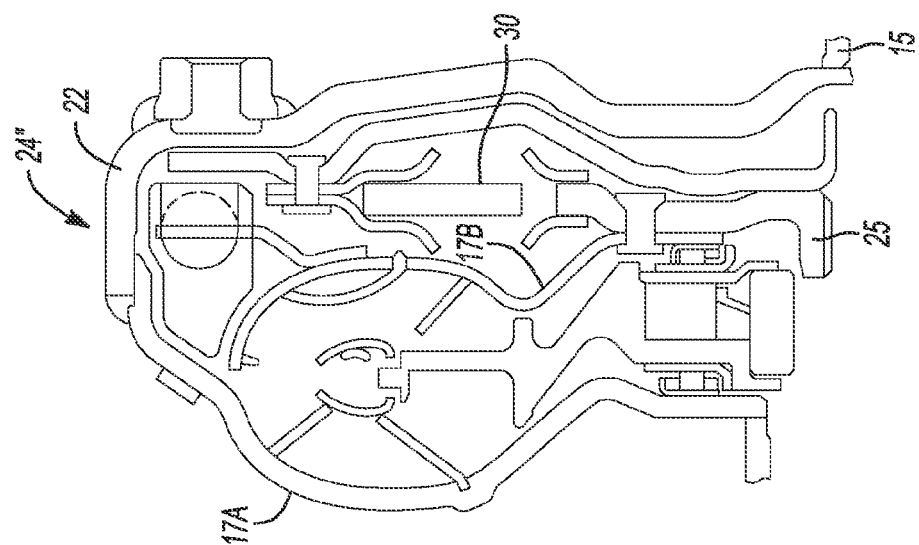
FIG. 3B is a cross-section of a torque converter having a tuned vibration absorber.
Figure 3A:
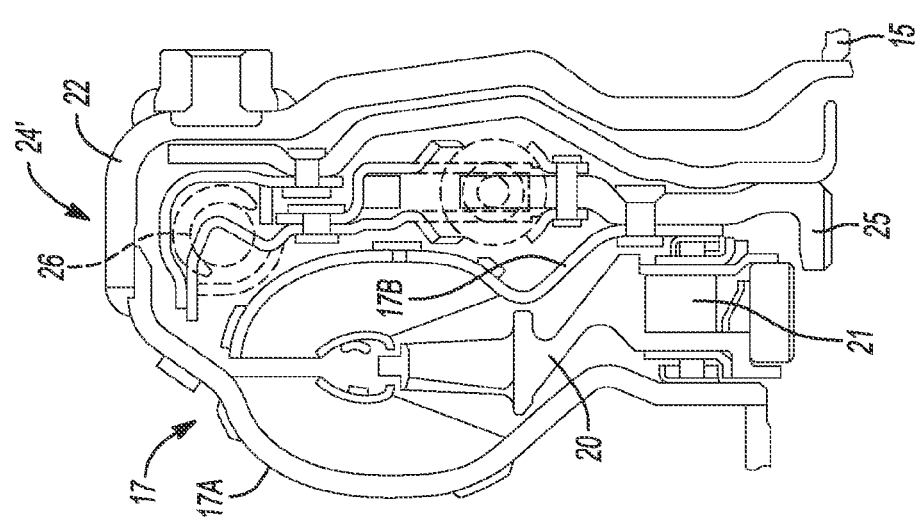
FIG. 3A is a cross-section of a torque converter having a 3-stage damper assembly.

Turning to FIG. 3A, in an alternate embodiment, the spring/damper assembly 24 in the torque converter 16 is replaced with a three-stage damper assembly 24'. The three-stage damper assembly 24' includes first, second, and third spring assemblies.

Turning to FIG. 3B, in an alternate embodiment, the spring/damper assembly 24 in the torque converter 16 is replaced with a tuned absorber 24". The tuned absorber 24" includes a mass 30 connected between the TCC 26 and the turbine 25.

Turning to FIG. 3C, in an alternate embodiment, the spring/damper assembly 24 in the torque converter 16 is replaced with a pendulum damper 24". The pendulum damper 24" includes a pendulum mass 32 connected to an intermediate plate 34 between the TCC 26 and the turbine 25.

Figure 4:
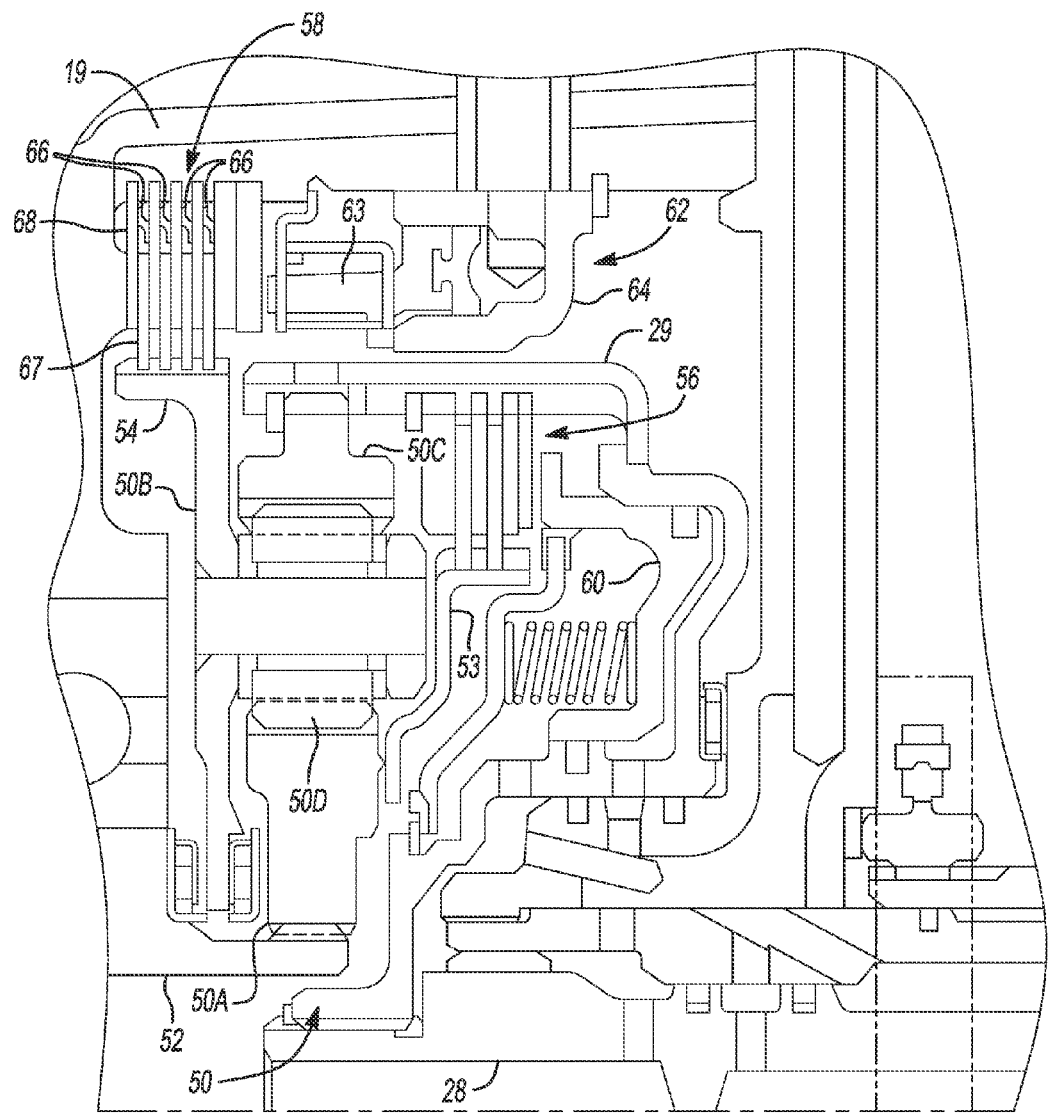
FIG. 4 is a cross-section of a planetary gear set assembly in the powertrain.

With reference to FIGS. 1, 2, and 4, the transmission 14 is a variable diameter pulley or sheave drive continuously variable transmission (CVT). The transmission 14 includes a typically cast, metal housing 19 which encloses and protects the various components of the transmission 14. The housing 19 includes a variety of apertures, passageways, shoulders and flanges which position and support these components. Generally speaking, the transmission 14 includes a transmission input shaft 28 and a transmission output shaft 30. The transmission input shaft 28 is connected to the output or turbine shaft 25 of the torque converter 16. Connected between the transmission input shaft 28 and the transmission output shaft 30 is a planetary gear set assembly 32 and a pulley assembly or continuously variable unit 34 that cooperate to provide forward and reverse speed or gear ratios between the transmission input shaft 28 and the transmission output shaft 30. The transmission input shaft 28 is functionally interconnected with the engine 12 through the torque converter 16 and receives input torque or power from the engine 12. The transmission output shaft 30 is preferably connected with a final drive unit 36. The transmission output shaft 30 provides drive torque to the final drive unit 36. The final drive 36 unit may include a differential, axle shafts, and road wheels (not shown).

The planetary gear assembly 32 includes a planetary gear set 50. The planetary gear set 50 includes a sun gear member 50A, a planet carrier member 50B and a ring gear member 50C. The planet carrier member 50B rotatably supports a set of planet gears 50D (only one of which is shown). The planet gears 50D are each configured to intermesh with both the sun gear member 50A and the ring gear member 50C.

The sun gear member 50A is connected for common rotation with a first shaft or interconnecting member 52. The planet carrier member 50B is connected for common rotation with a second shaft or interconnecting member 54. Alternatively the second shaft and the planet carrier member 50B may be integrally formed. The ring gear member 50C is connected for common rotation with the transmission input shaft or member 28 via an intermediate member or clutch housing member 29 connected to the input member 28.

Moreover, torque-transmitting mechanisms including clutch 56 and brake 58 are provided to allow for selective interconnection of the shafts or interconnecting members, members of the planetary gear sets and the housing. The torque-transmitting mechanisms are friction, dog or synchronizer type mechanisms or the like. For example, the clutch 56 is selectively engageable to connect the first interconnecting shaft or member 52 via a clutch hub 53 with the transmission input shaft 28. The brake 58 is selectively engageable to connect the second shaft or interconnecting member 54 with the transmission housing 19 in order to restrict relative rotation of the member 54 and therefore the carrier member gear 50B. The clutch 56 is engaged to provide forward speed or gear ratios. The brake 58 is engaged to provide reverse speed or gear ratios.

The clutch 56 is actuated by a piston 60 slidably disposed within the clutch housing 29. The brake 58 is actuated by a piston assembly 62. The piston assembly 62 includes a piston 63 slidably disposed within a piston housing 64. The piston housing 64 is a separate unit from the transmission housing 19 thus simplifying the machining requirements of the housing 19. The piston assembly 62 is coupled to an inside surface of the transmission housing 19. The piston assembly 62 is preferably a modular component, meaning that the component is a self-contained unit that can be altered, reoriented or replaced without affecting the remainder of the transmission housing 19. Furthermore, the brake 58 includes a plurality of separator springs 66 disposed between each of the adjacent clutch plates or linings 67 and reaction plates or friction plates 68. The separator springs 66 urge the brake 58 to a disengaged state thus reducing spin losses when the brake 58 is not engaged by the piston assembly 62.

Figure 5:
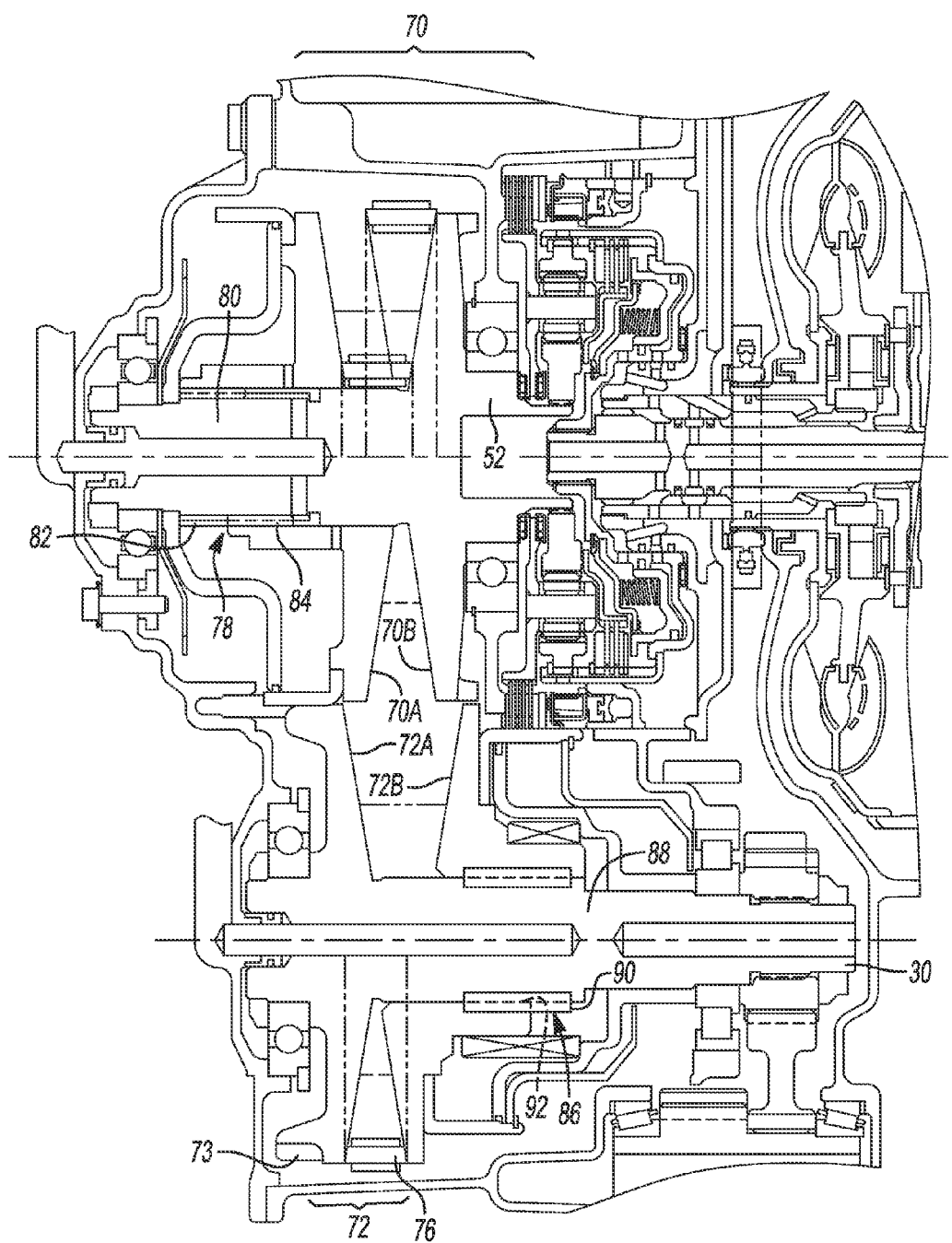
FIG. 5 is a cross-section of a continuously variable unit used in the powertrain.

With reference to FIGS. 1, 2, and 5, the first interconnecting member 52 is connected to or integrally formed with the pulley assembly 74. The pulley assembly 74 includes a first pulley or sheave pair 70 and a second pulley or sheave pair 72. The first pulley 70 includes a first truncated conical sheave or member 70A and second truncated conical sheave or member 70B in axial alignment with the first truncated conical sheave 70A. The second sheave 70B is directly connected for rotation with the first interconnecting member 52 and may be integrally formed with the first interconnecting member or shaft 52. The first sheave 70A is moveable axially relative to the second sheave 70B by a hydraulic control system (not shown) or other actuating system. It should be appreciated that the sheaves 70A and 70B may be axially switched without departing from the scope of the present invention.

The second pulley 72 includes a first truncated conical sheave or member 72A and second truncated conical sheave or member 72B in axial alignment with the first truncated conical sheave 72A. The second sheave 72B is directly connected for rotation with transmission output shaft or member 30 or may be integrally formed with the output shaft 30. The first sheave 72A is moveable axially relative to the second sheave 72B by a hydraulic control system (not shown) or other actuating system. It should be appreciated that the sheaves 72A and 72B may be axially switched without departing from the scope of the present invention. Furthermore, the sheave 72A includes a park gear 73 disposed on an outer diameter of the sheave 72A. The park gear 73 is connectable with a park mechanism (not shown).

A torque transmitting chain or endless member 76 having a V-shaped cross section is mounted between the first pulley pair 70 and the second pulley pair 72. While in the preferred embodiment the endless member 76 is a chain, it should be appreciated that other types of members, including belts, positive engagement devices or non-V-shaped belts or chains, may be employed without departing from the scope of the present invention. Drive torque communicated from the first interconnecting member 52 is transferred via friction between the sheaves 70A and 70B and the chain 76. The ratio of the input pulley 70 to the output pulley 72 is adjusted by varying the spacing between the sheaves 70A and 70B and between the sheaves 72A and 72B. For example, to change the ratio between the pulleys 70 and 72, the axial distance between sheaves 70A and 70B may be reduced by moving sheave 70A towards sheave 70B while simultaneously the axial distance between sheave 72A and 72B may be increased by moving sheave 72A away from sheave 72B. Due to the V-shaped cross section of the chain 76, the chain 76 rides higher on the first pulley 70 and lower on the second pulley 72. Therefore the effective diameters of the pulleys 70 and 72 change, which in turn changes the overall gear ratio between the first pulley 70 and the second pulley 72. Since the radial distance between the pulleys 70 and 72 and the length of the chain 76 is constant, the movement of the sheaves 70A and 72A must occur simultaneously in order to maintain the proper amount of tension on the chain 76 to assure torque is transferred from the pulleys 70, 72 to the chain 76. The CVU 36 provides an overall ratio from about 8.4 to about 6. Moreover, the pulleys 70 and 72 have a reduced diameter and an optimized center distance.

Compared to a typical belt drive, the chain 76 is tolerant to backlash between the pulley pairs 70A, 70B and pulley pairs 72A, 72B. Therefore, the sheave 70A is connected to the sheave 70B via an involute spline connection 78. For example, the sheave 70B includes an axially extending portion 80. A first involute spline 82 is formed on an outer diameter of the portion 80. A matching, second involute spline 84 is formed on an inner diameter of the sheave 70A. Sheave 70A slides axially on the portion 80 and the splines 82 and 84 mesh to form the spline connection 78. The spline connection 78 allows the sheaves 70A, 70B to move axially with respect to one another while coupling the sheaves 70A, 70B rotationally.

Likewise, the sheave 72B is connected to the sheave 72A via an involute spline connection 86. For example, the sheave 72A includes an axially extending portion 88 (integrally formed with the transmission output shaft 30). A first involute spline 90 is formed on an outer diameter of the portion 88. A matching, second involute spline 92 is formed on an inner diameter of the sheave 72B. Sheave 72B slides axially on the portion 88 and the splines 90 and 92 mesh to form the spline connection 86. The spline connection 86 allows the sheaves 72A, 72B to move axially with respect to one another while coupling the sheaves 72A, 72B rotationally. Any backlash between the sheaves is absorbed or compensated for by the chain 76.

Figure 6:
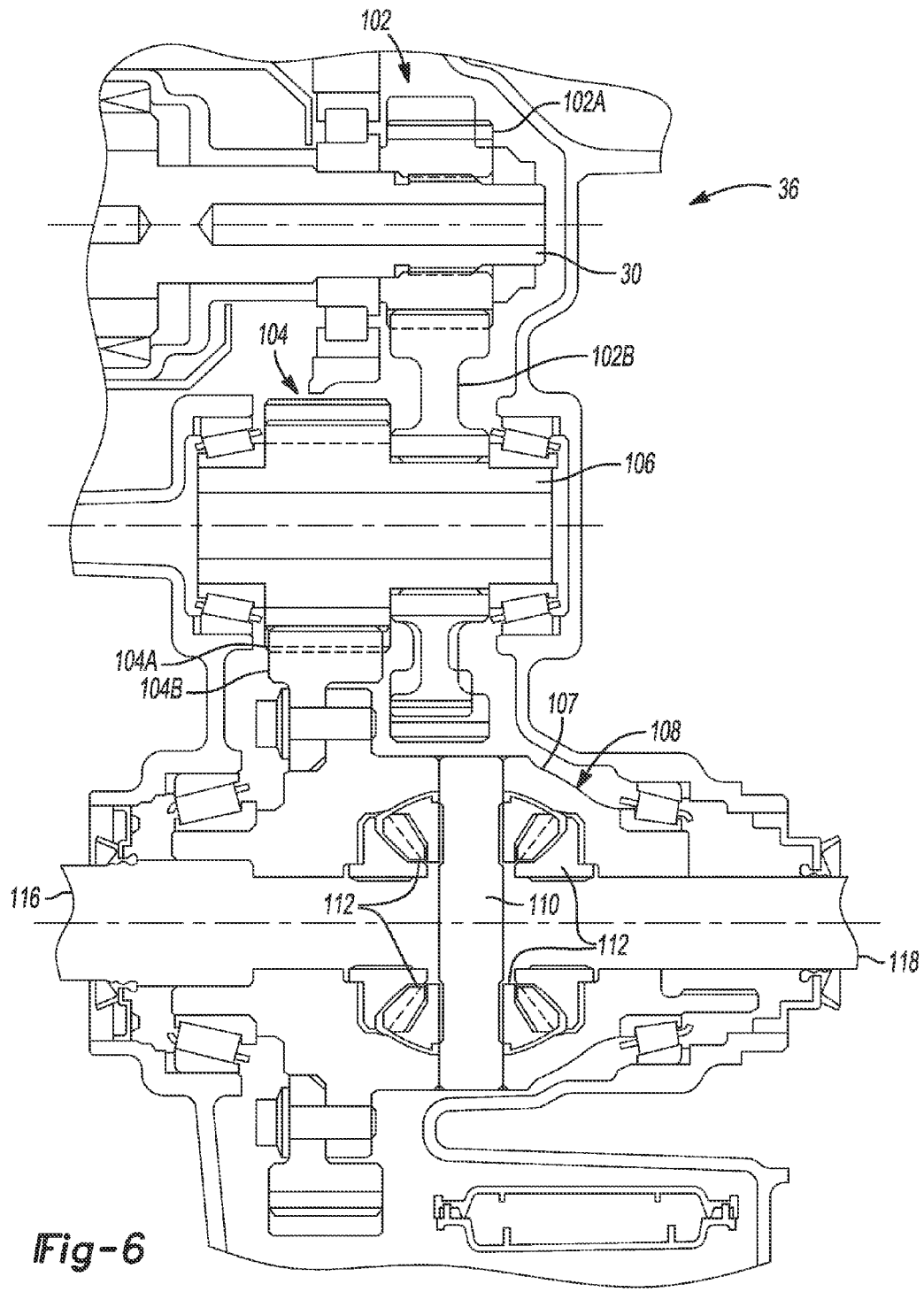
FIG. 6 is a cross-section of a final drive unit used in the powertrain.

With reference to FIGS. 1, 2 and FIG. 6, the pulley assembly 34 transfers torque to the final drive unit 36. The final drive unit 36 includes a first co-planar gear set 102 and a second co-planar gear set 104. The first gear set 102 includes a drive gear 102A intermeshed with a driven gear 102B. The driven gear 102B is connected to a transfer shaft or member 106. The transfer shaft 106 is connected to a drive gear 104A of the second planar gear set 104. The drive gear 104A is intermeshed with a driven gear 104B. The drive gear 104A may be formed as a sprocket or spline on the transfer shaft 106. The driven gear 104B is connected to a housing 107 of a pinion/gear assembly 108. The drive ratios of the first and second gear sets are designed to be flex gear meshes to provide the widest range of final drive ratios.

The pinion/gear assembly 108 includes a pin 110 that engages with a set of pinion gears 112 such that torque from the transmission 14 is transmitted through the housing 107 through the pin 108 and pinions 110 to a set of axles 114 and 116 that drive the front wheels of the motor vehicle. The final drive unit 36 may also include a pair of mechanisms 118 and 120 that engage with respective splines such that the transmission 14 is suitable for use in an all-wheel drive mode. The final drive unit 36 provides a final drive ratio range between about 7.0 to about 3.8. The co-planar gear sets 102, 104 have reduced diameters and optimized center distances.

Figure 7A:
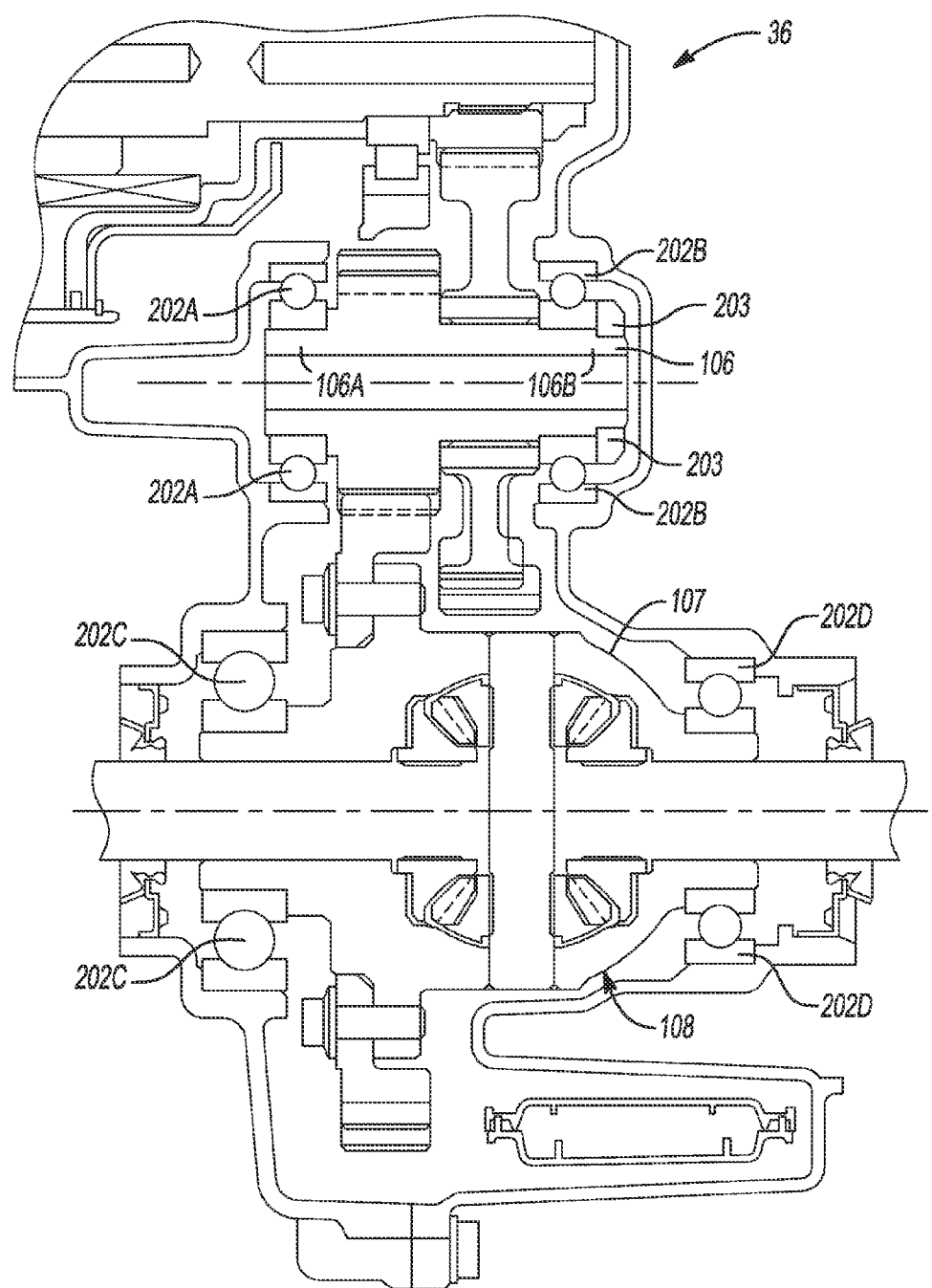
FIG. 7A is a cross-section illustrating a first support arrangement for supporting the final drive unit.
Figure 7B:
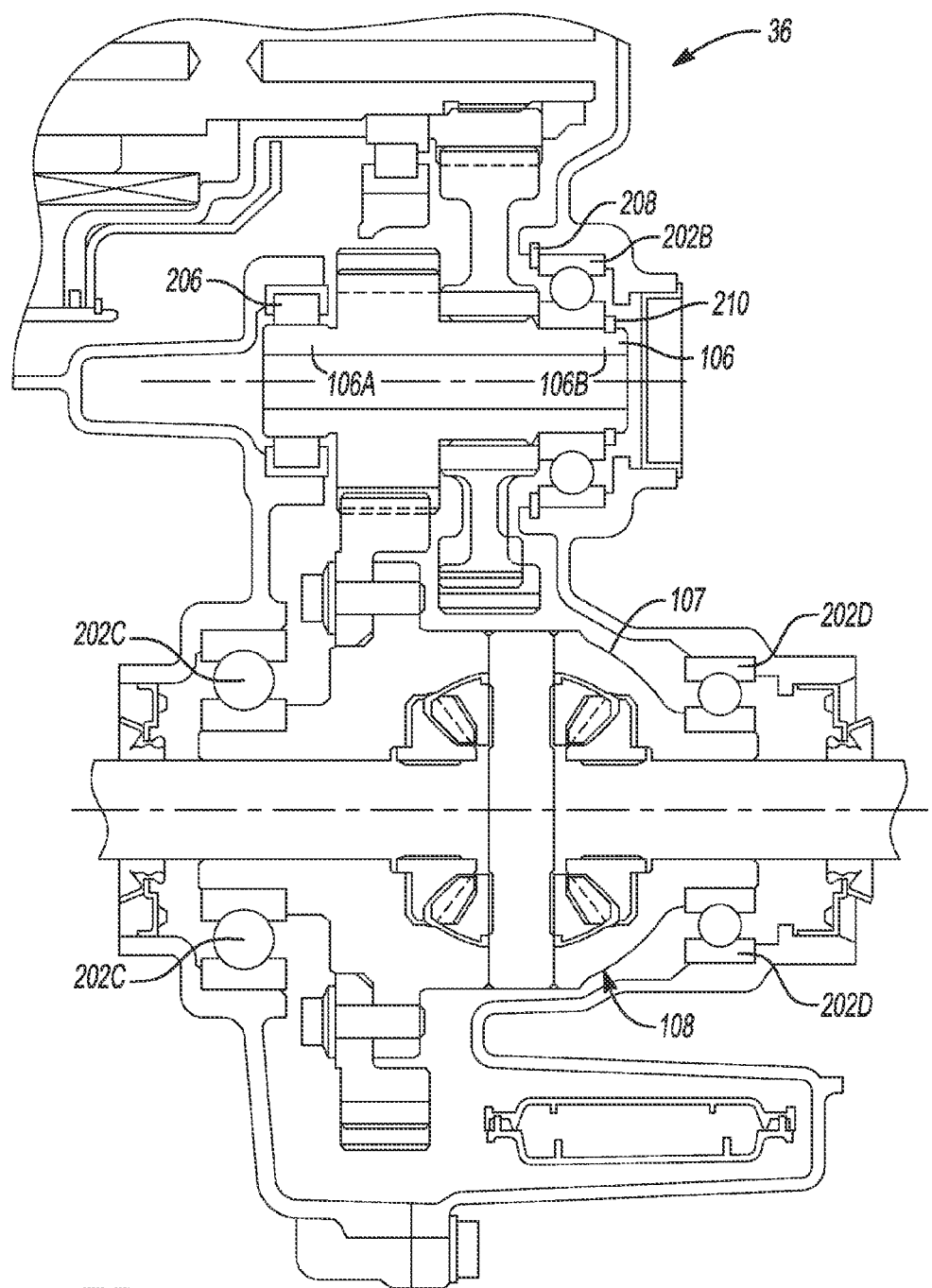
FIG. 7B is a cross-section illustrating a second support arrangement for supporting the final drive unit.
Figure 7C:
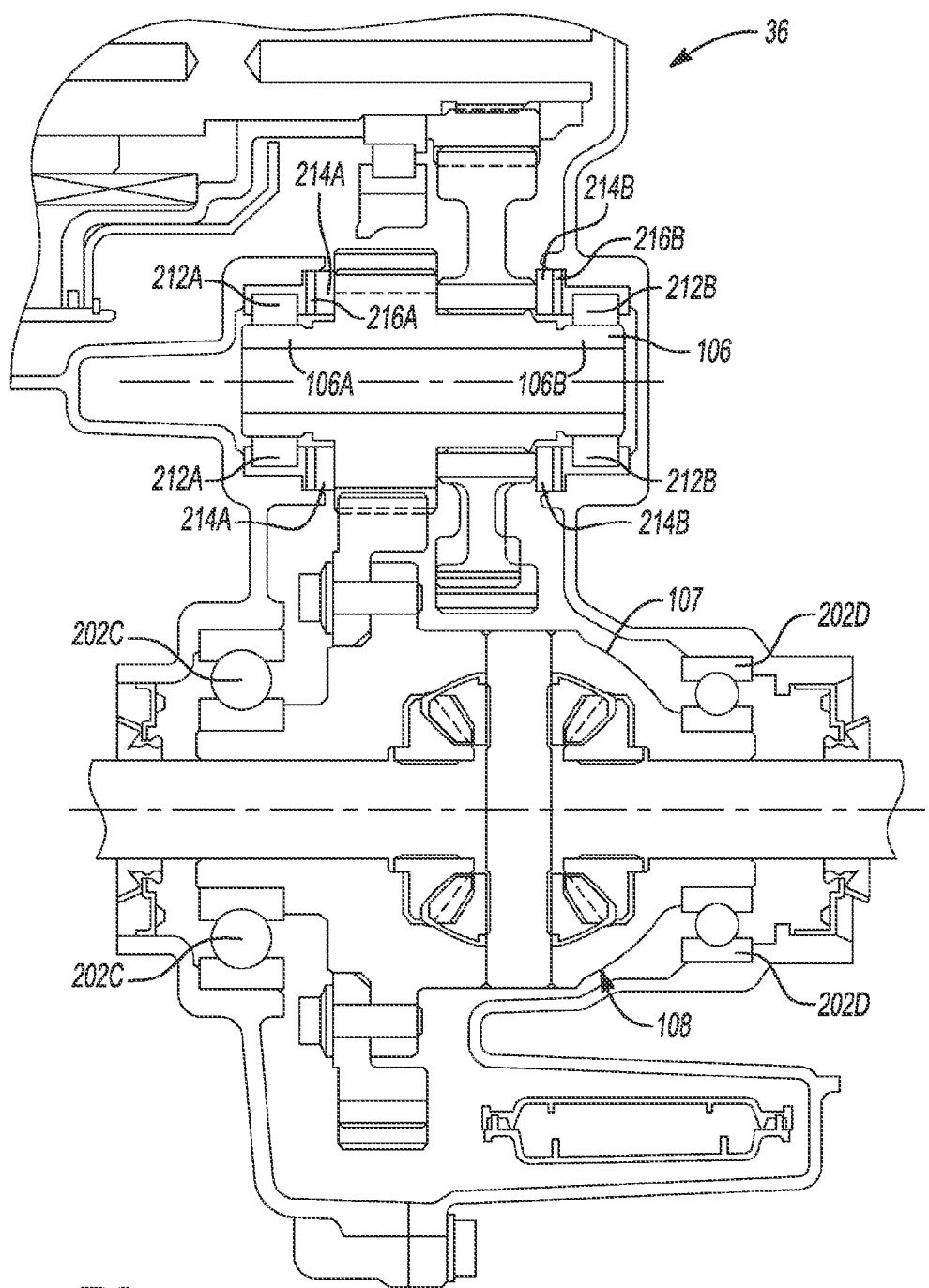
FIG. 7C is a cross-section illustrating a third support arrangement for supporting the final drive unit.

With reference to FIGS. 7A, 7B, and 7C, various strategies to support the final drive unit 36 within the transmission housing 19 are illustrated. In FIG. 7A, the transfer shaft 106 is supported at one end 106A by a first set of ball bearings 202A and supported at another, opposite end 106B by a second set of ball bearings 202B. An end ring 203 provides axial support to the second set of ball bearings 202B. The housing 107 of the pinion/gear assembly 108 is supported by a third set of ball bearings 202C and a fourth set of ball bearings 202D. The ball bearings transfer axial and radial loads from the final drive unit 36 to the transmission housing 19.

In FIG. 7B, the first set of ball bearings 202A have been replaced with a first set of needle or roller bearings 206. The roller bearings 206 transfer radial loads but do not transfer axial loads. However, roller bearings have lower losses than ball bearings. The end ring 203 has been replaced with first and second snap rings 208, 210 disposed on either side of the second set of roller bearings 202B. The snap rings 208, 210 allow the second set of roller bearings 202B to take axial loads in each direction. Furthermore, the second set of roller bearings 202B are enlarged with respect to those used in FIG. 7A.

In FIG. 7C, both the first and second sets of ball bearings 202A, 202B are replaced with first and second roller or needle bearings 212A, 212B and first and second sets of thrust bearings 214A, 214B. A first brace plate 216A is disposed between the first set of roller bearings 212A and the first set of thrust bearings 214A. A second brace plate 216B is disposed between the second set of roller bearings 212B and the second set of thrust bearings 214B. The thrust bearings 214A, 214B are disposed between brace plates 216A, 216B and the drive gear 104A and the driven gear 102B, respectively.

With reference to FIG. 8, the transmission 14 includes a valve body 300. The valve body 300 includes fluid passages, solenoids, and valves used to electro-hydraulically control the operation of the transmission 14. The valve body 300 is oriented vertically with respect to the transmission 14, i.e. exemplary valves 302 are vertical with respect to one another. The valve body 300 is disposed at a front of the transmission 14. For example, the housing 19 of the transmission 14 includes a bottom 19A, a top 19B, a back 19C, and a front 19D. A front cover 304 is connected to the front 19D of the housing 19 to cover the valve body 300. In an alternate embodiment, the valve body 300 may be disposed horizontally at the body 19A of the housing 19 with the cover 304 disposed overtop the valve body 300 and connected to the bottom 19A of the housing 19. The valve body 300 may also include external or internal electronic transmission range selection.

Turning to FIG. 9, the transmission 14 includes a main pump 402 disposed near the bottom 19A of the housing 19. The main pump 402 is preferably directly driven by the engine 12 via a chain connection (not shown). The main pump 402 may be of various types, for example, a gear pump, a vane pump, a gerotor pump, or any other positive displacement pump. The main pump 402 has an inlet that communicates with a sump filter 404 and an outlet that communicates with the valve body 300. FIG. 9 illustrates two preferred locations of an auxiliary pump 406. The auxiliary pump 406 is driven by an electric motor or other prime mover that is different from the prime mover that drives the main pump 402. The auxiliary pump 406 may be of various types, for example, a gear pump, a vane pump, a gerotor pump, or any other positive displacement pump. In one embodiment, the auxiliary pump 406 is deposed next to the main pump 402 near a bottom of the transmission housing 19. In another embodiment, the auxiliary pump 406 is disposed at a top of the transmission housing 19 and is external to the transmission housing 19.

The description of the invention is merely exemplary in nature and variations that do not depart from the gist of the invention are intended to be within the scope of the invention. Such variations are not to be regarded as a departure from the spirit and scope of the invention.

The following is claimed:

1. A powertrain for a motor vehicle comprising:
    an engine;
    a torque converter connected to the engine;
    a transmission having:
        a transmission housing;
        an input member connected to the torque converter;
        an output member;
        a planetary gear set having a ring gear member connected to the input member, a carrier member, and a sun gear member;
        a clutch selectively engageable to connect the input member and the ring gear member to the sun gear member;
        a brake selectively engageable to connect the carrier member to the transmission housing;
        a first pulley connected to the sun gear member;
        a second pulley connected to the output member;
        an endless member wrapped around the first pulley and the second pulley,
    wherein engagement of the clutch initiates a forward speed range and engagement of the brake initiates a reverse speed range;
    the powertrain further comprising a transfer shaft connected to a pinion and gear assembly, wherein the transfer shaft is rotatably supported within the transmission housing at one end by a first set of roller bearings and a first set of thrust bearings and rotatably supported within the transmission housing at another, opposite end by a second set of roller bearings and a second set of thrust bearings, wherein the first and second set of roller bearings and the first and second set of thrust bearings permit relative rotation between the transfer shaft and the housing.

2. The powertrain of claim 1 wherein the endless member is a chain and the first pulley includes a moveable sheave slidably disposed on a fixed sheave, and wherein the moveable sheave is connected to the fixed sheave by an involute spline connection.

3. The powertrain of claim 2 wherein the fixed sheave includes an axially extending portion and a first involute spline is formed on an outer diameter of the axially extending portion, and wherein the moveable sheave includes a second involute spline formed on an inner diameter of the moveable sheave, and the first involute spline is intermeshed with the second involute spline.

4. The powertrain of claim 1 wherein the brake is actuated by a piston assembly having a piston slidably disposed within a piston housing, and wherein the piston housing is a separate unit from the transmission housing.

5. The powertrain of claim 4 wherein the piston assembly is coupled to an inside surface of the transmission housing.

6. The powertrain of claim 5 wherein the brake includes a plurality of separator springs disposed between each of adjacent clutch plates and reaction plates, and wherein the separator springs bias the brake to a disengaged state.

7. The powertrain of claim 1 wherein the transfer shaft is connected to the output member of the transmission by a first co-planar gear set, wherein the transfer shaft is connected to the pinion and gear assembly by a second co-planar gear set, and wherein the transfer shaft and the pinion and gear assembly are supported within the transmission housing.

8. The powertrain of claim 1 wherein a first brace plate is disposed axially between the first set of roller bearings and the first set of thrust bearings and a second brace plate is disposed axially between the second set of roller bearings and the second set of thrust bearings.

9. The powertrain of claim 1 further comprising a main pump driven by the engine and an auxiliary pump, wherein the auxiliary pump is deposed adjacent to the main pump near a bottom of the transmission housing.

10. The powertrain of claim 1 further comprising a main pump driven by the engine and an auxiliary pump, wherein the auxiliary pump is disposed at a top of the transmission housing and is disposed external to the transmission housing.

11. The powertrain of claim 1 wherein the torque converter includes a three-stage damper assembly connected between the engine and the input member of the transmission.

12. The powertrain of claim 1 wherein the torque converter includes a tuned absorber connected between the engine and the input member of the transmission.

13. The powertrain of claim 1 wherein the torque converter includes a pendulum damper connected between the engine and the input member of the transmission.

14. A powertrain for a motor vehicle comprising:
an engine;
a torque converter connected to the engine; and
a transmission having:
   a transmission housing;
   an input member connected to the torque converter;
   an output member;
   a planetary gear set having a ring gear member connected to the input member, a carrier member, and a sun gear member;
   a clutch selectively engageable to connect the input member and the ring gear member to the sun gear member;
   a brake selectively engageable to connect the carrier member to the transmission housing;
   a first pulley having a first moveable sheave slidably disposed on a first fixed sheave, wherein the first fixed sheave is connected to the sun gear member, wherein the first fixed sheave includes a first axially extending portion and a first involute spline formed on an outer diameter of the first axially extending portion, and wherein the first moveable sheave includes a second involute spline formed on an inner diameter of the first moveable sheave, and the first involute spline is intermeshed with the second involute spline to rotationally couple the first fixed sheave to the first moveable sheave;
   a second pulley having a second moveable sheave slidably disposed on a second fixed sheave, wherein the second fixed sheave is connected to the output member of the transmission, and wherein the second fixed sheave includes a second axially extending portion and a third involute spline formed on an outer diameter of the second axially extending portion, and wherein the second moveable sheave includes a fourth involute spline formed on an inner diameter of the second moveable sheave, and the third involute spline is intermeshed with the fourth involute spline to rotationally couple the second fixed sheave to the second moveable sheave; and
   a chain wrapped around the first pulley and the second pulley,
wherein engagement of the clutch initiates a forward speed range and engagement of the brake initiates a reverse speed range;
the powertrain further comprising a transfer shaft connected to a pinion and gear assembly, wherein the transfer shaft is rotatably supported within the transmission housing at one end by a first set of roller bearings and a first set of thrust bearings and rotatably supported within the transmission housing at another, opposite end by a second set of roller bearings and a second set of thrust bearings, wherein the first and second set of roller bearings and the first and second set of thrust bearings permit relative rotation between the transfer shaft and the housing.

15. The powertrain of claim 14 wherein the brake is actuated by a piston assembly having a piston slidably disposed within a piston housing, and wherein the piston housing is a separate, modular unit connectable to an inside surface of the transmission housing.

16. The powertrain of claim 15 wherein the brake includes a plurality of separator springs disposed between each of adjacent clutch plates and reaction plates, and wherein the separator springs bias the brake to a disengaged state.

17. The powertrain of claim 14 wherein the transfer shaft is connected to the output member of the transmission by a first co-planar gear set, wherein the transfer shaft is connected to the pinion and gear assembly by a second co-planar gear set, and wherein the transfer shaft and the pinion and gear assembly are supported within the transmission housing.

18. The powertrain of claim 14 wherein the transfer shaft is in mesh with a gear formed on a housing of the pinion and gear assembly.

* * * * *